United States Patent [19]

Stecklein

[11] 4,203,684
[45] May 20, 1980

[54] ARTICULATED JOINT INCLUDING BELLEVILLE SPRING SEALS MAINTAINED IN PRESELECTED COMPRESSED STATE

[75] Inventor: Gary L. Stecklein, Dubuque, Iowa

[73] Assignee: Deere & Company, Moline, Ill.

[21] Appl. No.: 20,694

[22] Filed: Mar. 15, 1979

[51] Int. Cl.² ............................................. F16C 11/00
[52] U.S. Cl. .................................... 403/158; 414/723; 277/236; 403/288
[58] Field of Search ............... 403/157, 158, 161, 162, 403/163, 146, 288, 154, 156; 277/95, 236; 37/118 A, 118 R, 17.5; 172/273, 762; 414/723, 722

[56] References Cited

U.S. PATENT DOCUMENTS

| | | | |
|---|---|---|---|
| 1,363,477 | 12/1920 | Lowe | 403/156 |
| 3,432,214 | 3/1969 | Cashman et al. | 403/156 X |
| 3,554,588 | 1/1971 | Reinsma et al. | 403/38 X |
| 3,923,313 | 12/1975 | Bailey | 277/63 |
| 3,997,274 | 12/1976 | Iverson | 403/10 |
| 4,004,855 | 1/1977 | Stecklein | 403/288 X |

FOREIGN PATENT DOCUMENTS 2245134 4/1974 Fed. Rep. of Germany ........... 403/288

Primary Examiner—Andrew V. Kundrat

[57] ABSTRACT

A first member includes a pair of parallel portions disposed on opposite sides of a second member and pivotally interconnected thereto by means of a pivot pin assembly including aligned holes in the parallel portions and the second member. The pivot assembly further includes a bushing received in the hole of the second member and a pin received in the bushing and in first and second collars respectively press fit into the holes in the pair of parallel portions. In a first embodiment the collars respectively act directly against first and second sets of Belleville springs received on the pin at the opposite ends of the bushing. In a second embodiment the collars respectively act against a pair of flat washers to hold the latter against the opposite sides of the second member and against the sets of Belleville washers. In a third embodiment the collars have a larger outside diameter than does the hole in the second member and the collars are positioned directly against the opposite sides of the second member and in engagement with the sets of Belleville washers.

2 Claims, 3 Drawing Figures

ARTICULATED JOINT INCLUDING BELLEVILLE SPRING SEALS MAINTAINED IN PRESELECTED COMPRESSED STATE

BACKGROUND OF THE INVENTION

The present invention relates to articulated connections and more specifically relates to fixed width, yoke-type joints utilizing opposed pairs of Belleville washers as sealing means.

The use of Belleville springs as seals in fixed width, yoke-type joints has had limited use primarily because of the difficulty involved in assembling the joint while maintaining the desired amount of washer deflection.

U.S. Pat. No. 4,004,855 issued to the applicant of the instant application on Jan. 25, 1977, represents one solution to the problems of assembly and spring compression maintenance. In the patented structure, a first member includes a pair of parallel portions located on the opposite sides of a second member. The parallel portions and the second member are provided with aligned holes, and a bushing shorter than the length of the hole in the second member is received therein. Located on the pin at the opposite ends of the bushing are first and second pairs of opposed Belleville springs which, when uncompressed, have a length greater than the difference between the length of the bushing and that of the hole in the second member. A pair of adjustable width wedge assemblies are respectively mounted to the pair of parallel portions between the latter and the opposite sides of the second member for the purpose of compressing the sets of Belleville springs into the hole in the second member. The wedge pieces have the disadvantage of complicating the manufacture and thus unduly increasing the cost of the joint assemblies.

SUMMARY OF THE INVENTION

According to the present invention, there is provided a novel manner of constructing fixed width, yoke-type pivot joints including Belleville springs acting as seals and, more specifically, there is provided simple means for maintaining the Belleville springs properly compressed for efficient sealing.

A broad object of the invention is to provide a yoke-type pivot joint including Belleville springs acting as seals and held in a compressed seal-effecting condition by members which are of simple construction and are easy to install.

Another object of the invention is to provide means for transferring side loads imposed on the member forming the outside of the yoke-type joint to the member forming the inside of the joint without going through the Belleville springs.

Yet another object of the invention is to provide a yoke-type joint wherein the Belleville springs are compressed within a hole located in the inside member of the yoke either by means of a pair of collars or a pair of flat washers which respectively bear on the opposite sides of the last-mentioned member.

A more specific object of the invention is to provide a yoke-type pivot joint, as set forth in the foregoing objects, wherein a pair of collars are press fit into aligned holes of parallel portions of a first member forming the outside of the joint.

These and other objects will become apparent from a reading of the following description together with the appended drawings.

DESCRIPTION OF THE PREFERRED EMBODIMENT

Figure 1:
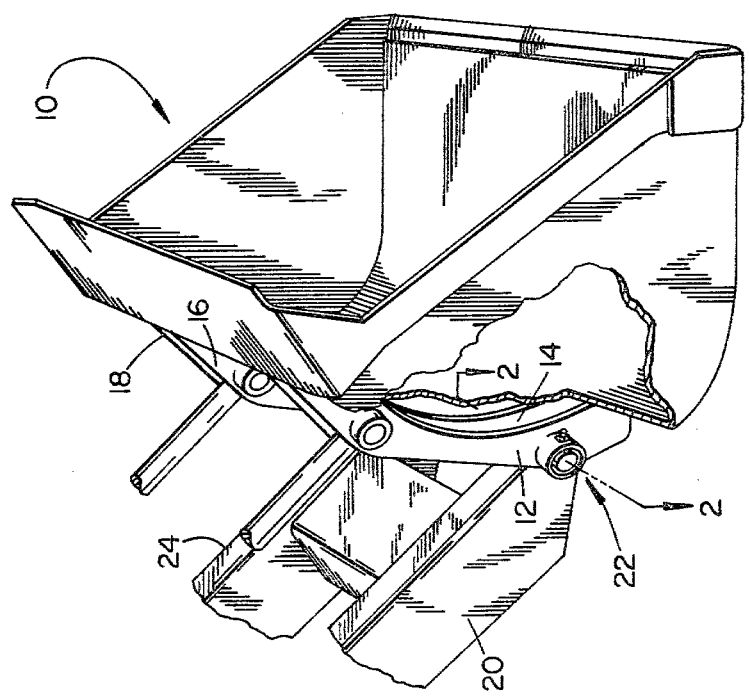
FIG. 1 is a left, rear perspective view showing a loader bucket pivotally connected to the forward ends of a pair of loader lift arms by joint assemblies embodying the principles of the present invention.

Referring now to FIG. 1, therein is shown a loader bucket 10 including, as integral portions thereof, a right pair of parallel spaced apart right and left flanges 12 and 14 and a left pair of similar right and left flanges 16 and 18. A right loader lift arm 20 has its forward end located between and pivotally connected to the right pair of flanges 12 and 14 by a pivot assembly 22 and a left loader lift arm 24 is similarly pivotally connected to the left pair of flanges 16 and 18 by a pivot assembly (not shown).

As the pivot assemblies are identical, only the right asssembly 22 is disclosed and discussed in detail.

Figure 2:
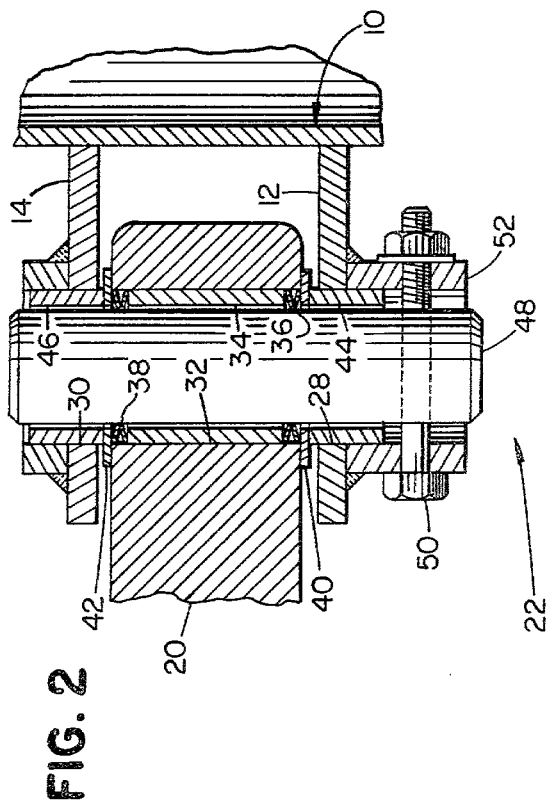
FIG. 2 is a longitudinal sectional view of one of the joint assemblies.

Thus, with reference to FIG. 2, it can be seen that the pivot assembly 22 includes holes 28 and 30 respectively located in the flanges 12 and 14 in axial alignment with each other and a hole 32 located in the lift arm 20. A bushing 34 is press fit in the hole 32 and is a predetermined amount shorter than the length of the hole. Right and left pairs of opposed Belleville springs 36 and 38 are respectively positioned in the hole 32 at the right and left ends of the bushing 34. The pairs of springs 36 and 38 are shown in a preselected compressed state in which they are respectively held by right and left flat washers 40 and 42, which are in turn respectively held in place by right and left collars 44 and 46 press fit into the holes 28 and 30. The washers 40 and 42 have outside diameters larger than the diameter of the hole 32 and respectively engage the opposite sides of the arm 20 when the collars 44 and 46 are in position. Thus, side loads experienced by the bucket 10 are transferred to the lift arm 20 via the collars 44 and 46 and washers 40 and 42 without passing through the pairs of Belleville springs 36 and 38 which results in increased spring life. However, it should be understood that in applications where side loads are not present, the pairs of washers 40 and 42 could be eliminated, in which case the collars would be press fit directly into engagement with the pairs of springs. Received centrally in the bushing 34 and collars 44 and 46 is a pivot pin 48 which is retained from rotating or shifting axially by means of a bolt 50 passing therethrough and through a cylindrical ring 52 fixed to the outer surface of the right flange 12.

Figure 3:
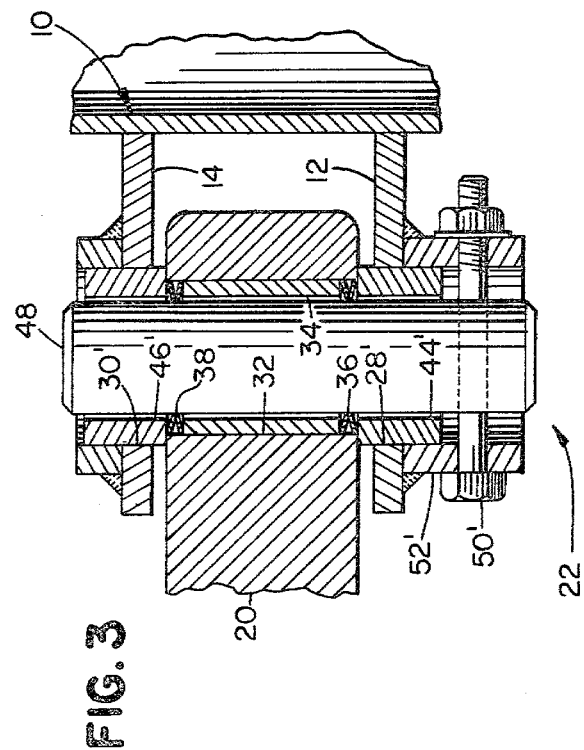
FIG. 3 is a longitudinal sectional veiw of an alternate embodiment of the joint assembly.

In FIG. 3, there is shown an alternate embodiment of the pivot assembly 22 which eliminates the need for the flat washers 40 and 42. Specifically, this is done by enlarging the holes 28 and 30 in the flanges 12 and 14 to form holes 28' and 30' and by substituting enlarged collars 44' and 46' for the collars 44 and 46, the collars 44' and 46' then being pressed directly up against the opposite sides of the arm 20 and against the pairs of Belleville springs 36 and 38. Of course, the enlargement of the holes 28 and 30 necessitates the replacement of the cylindrical ring 52 by a larger ring 52' and the bolt 50 by a longer bolt 50'. All of the components which remain the same as those described in the reference to FIG. 2 are gien the same reference numeral.

It will thus be appreciated that the collars and flat washers both constitute simple parts which are easy to install and which function to maintain the pairs of Belleville springs in a preselected deflected state for efficient sealing.

I claim:

1. In an articulated connection between first and second members, the first member including a pair of parallel portions disposed on opposite sides of and pivotally interconnected to the second member by a pivot pin assembly including aligned holes located in the pair of parallel portions and the second member and a bushing press fit into the hole in the second member and having a length less than that of the last-mentioned hole, first and second pairs of opposed Belleville springs received on the pin and the combined length of the bushing and uncompressed Belleville springs being greater than the length of the hole in the second member, the improvement, comprising: first and second collars respectively press fit in the holes of the pair of parallel portions; first and second flat washers respectively being located between the first collar and first pair of Belleville springs, and between the second collar and second pair of Belleville springs; said washers having a diameter greater than the diameter of the hole in the second member; and said collars being located such as to hold said first and second flat washers against opposite sides of the second member.

2. In an articulated connection between first and second members, the first member including a pair of parallel portions disposed on opposite sides of and pivotally interconnected to the second member by a pivot pin assembly including aligned holes located in the pair of parallel portions and the second member and a bushing press fit into the hole in the second member and having a length less than that of the last-mentioned hole; first and second pairs of opposed Belleville springs received on the pin and the combined length of the bushing and uncompressed Belleville springs being greater than the length of the hole in the second member, the improvement, comprising: said holes in the parallel portions being larger in diameter than the hole in the second member; and first and second collars respectively press fit in the holes in the pair of parallel portions and positioned against the opposite sides of the second member.

* * * * *